United States Patent
Levy et al.

(10) Patent No.: US 11,308,541 B2
(45) Date of Patent: *Apr. 19, 2022

(54) NEXT GENERATION IMPROVEMENTS IN RECOMMENDATION SYSTEMS

(71) Applicant: B7 Interactive, LLC, San Antonio, TX (US)

(72) Inventors: Kenneth L. Levy, Stevenson, WA (US); Neil E. Lofgren, White Salmon, WA (US)

(73) Assignee: B7 Interactive, LLC, San Antonio, TX (US)

(*) Notice: Subject to any disclaimer, the term of this patent is extended or adjusted under 35 U.S.C. 154(b) by 90 days.

This patent is subject to a terminal disclaimer.

(21) Appl. No.: 16/365,669

(22) Filed: Mar. 26, 2019

(65) Prior Publication Data

US 2019/0220916 A1    Jul. 18, 2019

Related U.S. Application Data

(60) Division of application No. 14/133,818, filed on Dec. 19, 2013, now Pat. No. 10,275,818, which is a
(Continued)

(51) Int. Cl.
*G06Q 30/06*    (2012.01)
*G06Q 30/02*    (2012.01)

(52) U.S. Cl.
CPC ......... *G06Q 30/0631* (2013.01); *G06Q 30/02* (2013.01)

(58) Field of Classification Search
CPC .................. G06Q 30/0631; G06Q 30/02
(Continued)

(56) References Cited

U.S. PATENT DOCUMENTS

| | | | | |
|---|---|---|---|---|
| 6,412,012 B1* | 6/2002 | Bieganski | .............. | G06Q 30/02 709/232 |
| 7,403,910 B1* | 7/2008 | Hastings | ................ | G06Q 30/02 705/26.1 |

(Continued)

FOREIGN PATENT DOCUMENTS

WO    WO-2010001406 A1 *    1/2010    ............. G06Q 30/02

OTHER PUBLICATIONS

Grazyna Suchacka, Grzegorz Chodak. "Using association rules to assess purchase probability in online stores." Aug. 26, 2016. Retrieved from: https://link.springer.com/content/pdf/10.1007/s10257-016-0329-4.pdf (Year: 2016).*

*Primary Examiner* — Michael Misiaszek
(74) *Attorney, Agent, or Firm* — Trop, Pruner & Hu, P.C.

(57) ABSTRACT

This invention deals with the next generation improvements in recommendation systems. Retailers want to grow their business and increase sales. One embodiment displays recommendations for inside sales during calls to prospects via a CRM. Another embodiment improves genomic cross-sell by summing correlations between attributes. A third embodiment improves cross-channel personalization by linking personal information, preferably via a one-way hash, to a unique customer ID. A fourth embodiment enables a common core mobile app for different retailers. A fifth embodiment identifies a shopper before purchase to provide personal recommendations while shopping. A sixth embodiment utilizes a market place with shared customers for customer acquisition. A seventh embodiment utilizes customers' preferences and characteristics and sales data to influence recommendations. The characteristics can be combined into a shopper psychographic persona to generate recommendations. An eight embodiment is a market place for customers to shop, which is used for customer acquisition for participating retailers. A ninth embodiment shows
(Continued)

how to improve search results based upon analysis of purchase data, and correlation of clicks on search results and search terms. A tenth embodiment calculates a buy index based upon value of products purchased versus products viewed to segment shoppers to determine discounts and re-marketing. An eleventh embodiment automates the creation of a dynamic website, usually for responsive design.

7 Claims, 7 Drawing Sheets

Related U.S. Application Data continuation-in-part of application No. 13/492,859, filed on Jun. 9, 2012, now Pat. No. 10,269,021, which is a continuation-in-part of application No. 13/107,858, filed on May 13, 2011, said application No. 13/492,859 is a continuation-in-part of application No. 12/764,091, filed on Apr. 20, 2010, now abandoned.

(60) Provisional application No. 61/739,124, filed on Dec. 19, 2012, provisional application No. 61/806,331, filed on Mar. 28, 2013, provisional application No. 61/495,381, filed on Jun. 10, 2011, provisional application No. 61/549,244, filed on Oct. 20, 2011, provisional application No. 61/599,428, filed on Feb. 16, 2012, provisional application No. 61/610,090, filed on Mar. 13, 2012, provisional application No. 61/334,185, filed on May 13, 2010, provisional application No. 61/171,055, filed on Apr. 20, 2009, provisional application No. 61/179,074, filed on May 18, 2009, provisional application No. 61/224,914, filed on Jul. 13, 2009, provisional application No. 61/229,617, filed on Jul. 29, 2009, provisional application No. 61/236,882, filed on Aug. 26, 2009.

(58) Field of Classification Search
USPC .......................................................... 705/26.7
See application file for complete search history.

(56) References Cited

U.S. PATENT DOCUMENTS

| | | | | |
|---|---|---|---|---|
| 7,836,051 | B1* | 11/2010 | Mason | G06Q 30/02 |
| | | | | 707/734 |
| 8,429,026 | B1* | 4/2013 | Kolawa | G06Q 30/00 |
| | | | | 705/26.7 |
| 2002/0019763 | A1* | 2/2002 | Linden | G06Q 30/0255 |
| | | | | 705/14.53 |
| 2002/0109718 | A1* | 8/2002 | Mansour | G06F 9/452 |
| | | | | 715/744 |
| 2009/0254971 | A1* | 10/2009 | Herz | G06Q 30/0603 |
| | | | | 726/1 |
| 2014/0220516 | A1* | 8/2014 | Marshall | G09B 19/0092 |
| | | | | 434/127 |

* cited by examiner

NEXT GENERATION IMPROVEMENTS IN RECOMMENDATION SYSTEMS

CROSS-REFERENCE TO RELATED APPLICATIONS

This application is a divisional of, and claims the benefit of, U.S. patent application Ser. No. 14/133,818 filed Dec. 19, 2013 (published as US2014/0172627) entitled "Next Generation Improvements in Recommendation Systems" which is incorporated by reference and which claims the benefit of Provisional Patent Application Ser. No. 61/739,124 filed Dec. 19, 2012, and Ser. No. 61/806,331 filed Mar. 28, 2013, both entitled "Next Generation Improvements in Recommendation Systems" and both of which are incorporated by reference. Said application Ser. No. 14/133,818 is a Continuation-in-Part of, and claims the benefit of, U.S. patent application Ser. No. 13/492,859 filed Jun. 9, 2012 (published as US 2012/0316986A1) entitled "More Improvements in Recommendation Systems" which is incorporated by reference and which claims the benefit of Provisional Patent Application Ser. No. 61/495,381 filed Jun. 10, 2011, Ser. No. 61/549,244 filed Oct. 20, 2011, Ser. No. 61/599,428 filed Feb. 16, 2012, and Ser. No. 61/610,090 filed Mar. 13, 2012, all entitled "More Improvements in Recommendation Systems", and all of which are incorporated by reference. Said application Ser. No. 13/492,859 is a Continuation-in-Part of, and claims the benefit of, U.S. patent application Ser. No. 13/107,858 filed May 13, 2011 (published as US2011/0282821A1) entitled "Further Improvements in Recommendation Systems" which is incorporated by reference and which claims the benefit of Provisional Patent Application Ser. No. 61/334,185 filed May 13, 2010 entitled "Further Improvements in Recommendation Systems" which is incorporated by reference. Said application Ser. No. 13/492,859 is also a Continuation-in-Part of, and claims the benefit of, U.S. patent application Ser. No. 12/764,091 filed Apr. 20, 2010 (published as US2010/0268661A1) entitled "Improvements in Recommendation Systems" which is incorporated by reference and which claims the benefit of Provisional Patent Application Ser. No. 61/171,055 filed Apr. 20, 2009, Ser. No. 61/179,074 filed May 18, 2009, Ser. No. 61/224,914 filed Jul. 13, 2009, Ser. No. 61/229,617 filed Jul. 29, 2009, and Ser. No. 61/236,882 filed Aug. 26, 2009, all entitled "Improvements in Recommendation Systems" and all of which are incorporated by reference.

TECHNICAL FIELD OF INVENTION

The present invention relates to recommendation systems, data mining, and knowledge discovery in databases.

BACKGROUND OF THE INVENTION

Recommendation systems have two parts, generator and recommendation engine. The generator creates the recommendations. It lists N, usually 20, recommended items (or users) for each target item (user). It can be manual entry, but is usually an automated system using correlation, Bayesian, or neural networks to relate items based upon user actions. The recommendation engine receives requests for recommendations, and returns the recommended items. The request usually includes the number of desired recommendations and type of recommendations (cross-sell, similar, or personal).

There are numerous examples including patent application Ser. No. 12/764,091 (publication US 2010-0268661 A1) entitled "Improvements in Recommendations Systems" by Ken Levy and Neil Lofgren, patent application Ser. No. 13/107,858 (publication US 2011-0282821 A1) entitled "Further Improvements in Recommendation Systems" by Ken Levy and Neil Lofgren, and patent application Ser. No. 13/492,859 (publication US 2012-0316986 A1) entitled "More Improvements in Recommendation Systems" by Ken Levy and Neil Lofgren, all incorporated herein by reference.

Recommendation solutions are not used for inside sales since most sales tools don't have the customer behavior required to create recommendations. The recommendations would help the salesperson suggest products to the prospect. In addition, it is difficult to create accurate recommendations for new products or products with few sales. Furthermore, prospects now shop online via computers, tablets and phones, as well as in-store via mobile apps. It's ideal to recognize them across these channels. The in-store apps are currently custom developed and expensive. Recommendations are currently served to point-of-sale solutions during payment, which can be too late. Recommendations should be personal based upon shopper's preferences and shopper's characteristics. Market places can be used for customer acquisition.

Furthermore, websites are expensive to build and maintain. They require expensive technical resources, especially mobile and responsive websites. Websites are critical today, especially mobile sites with the penetration of smart phones.

SUMMARY OF THE INVENTION

This patent application traverses the numerous limitations discussed in the background.

Recommendations for an inside sales person are created according to methods in the previously incorporated applications using behavioral data from the ERP, accounting or website, and displayed in the CRM window for each prospect. The display also includes previously purchased products, preferably arrange by the likelihood that the recommendations are bought with these purchased items. This increases successful sales calls.

Improved genomic cross-sell recommends products that share many categories that are bought together. The correlation between categories is calculated with any method. The novel calculation sums the correlation between all category pairs for the product pair, scaled by the sales of the recommended product. In one embodiment, only the top selling products for each category are included in the calculation to improve efficiency.

Cross-channel personalization is improved by linking personal information, preferably one-way hash of email address, physical address and/or credit card numbers, to a master unique customer ID. The unique customer ID and personal information is created from a master data source, and results in a link table between personal information and the customer ID for the personalization engine. The master data source is typically a website or ERP solution. Then, personal information from alternative channels is linked to the customer ID via the link table such that the customer is recognized and cross-channel personalization is optimized.

A mobile app with common core functionality reduces development cost for different retailers. It also enables a shopper to download one app and use in multiple stores or chains. The common core uses a template for customization of the graphical display in each store. It also standardizes the data format and links to the retailer's database. The mobile app enables the shopper or sales rep to search for products, find them in the store, read reviews, comparative prices, and located cross-sell and similar items personalized to the shopper, if possible.

A novel in-store recommendation solution identifies the shopper before their time of purchase by reading an affinity card, credit card, of having a mobile app send the information when inside or near the store. Thus, recommendations can be personalized while the shopper is shopping. The recommendations are shown in a point-of-sale display, printout, tablet held by an employee or the shopper's mobile phone.

Customer preferences of product attributes influence recommendations such that if a customer prefers an attribute, products with those attributes are promoted. The preference can be set by the customer or determined from previous purchases of products with said attribute.

Customer characteristics are related to a product based upon percentage of purchase using previous sales data. The percentages are used to determine the likelihood that a new shopper buys a product based upon the new shopper's characteristics and a list of the largest percentages. For new products, customer characteristics are related to a product attribute based upon percentage of purchase using previous sales data. The percentages are used to determine the likelihood that a new shopper buys a product attribute. The average of likelihoods for all attributes of a product is used to determine if a shopper buys a product.

A shopper persona is created based upon shopper characteristics, such as gender, age range, location, income range, etc. A persona is related to products based upon purchases of shoppers with that persona. The products with the most sales or likelihood of purchase are persona recommendations. These are the products that a shopper with that persona are likely to buy. Personal recommendations for a shopper are based upon (1) cross-sell for purchased products, (2) cross-sell or similar recommendations for viewed products, and (3) persona recommendations. The process is taken a step further to find new shoppers that are likely to buy a product (rather than products that a new shopper are likely to buy). These are shoppers with persona's that are likely to buy that product. Persona recommendations also influence personal recommendations for shoppers with purchase activity.

A market place can help retailers with customer acquisition based upon customer's purchases and characteristics.

The connection of purchases in retail, obtained from a recommendation engine, and clicks on search results improves search engines, such as Bing or Google. The top selling products, top selling attributes, and correlation of user characteristics that purchase product attributes, labeled shopping preferences, are determined from the purchases and used to improve search results. The shopper characteristics are linked to purchases of product attributes such that search results with attributes linked to the searcher's characteristics are ranked higher. In addition, the recommendation engine determines related search results based upon common users clicking on both results, such that related search results are increased in ranking if one result is listed. Furthermore, the recommendation engine can relate search terms that are searched by common users to provide alternative suggestions for search terms.

A buy index is used to segment shoppers and determine if the shopper requires a discount to purchase or should be part of a re-marketing campaign. The buy index is calculated as the ratio of the value of product purchases to product views, with a threshold. The buy index is preferably calculated by tracking the shopper across multiple retailers, where the retailers agree to share anonymous data in a co-op.

Responsive and mobile websites are important, and expensive to create and maintain. Our novel approach uses a dashboard, JavaScript and CSS to dynamically create a responsive website, or any website. The three steps are to (1) automatically map IDs to website elements, (2) allow the user to graphically design the website based upon criteria, such as windows size or operating system, and (3) create JavaScript and CSS to realize the website.

In summary, the following include some of the inventive aspects of this application:

1. A method to create recommendations for inside sales comprising the steps of:
   a. Obtaining behavioral data from a system,
   b. Calculating personal recommendations that each prospect is likely to buy, and
   c. Displaying said personal recommendations in another system that is used by a sales person to contact prospects,
   wherein at least one of the steps utilizes a computing device.
2. The method of claim 1 wherein previously purchased products are displayed along with said personal recommendations.
3. The method of claim 2 wherein said previously purchased products are sorted by their likelihood to be bought with said personal recommendations.
4. A method to create improved genomic cross-sell comprising the steps of:
   a. Calculating the correlation between category pairs,
   b. Determining multiple pairs of categories for product pairs, and
   c. Summing the correlation of said pairs of categories to determine the likelihood of purchase of the product pair,
   wherein at least one of the steps utilizes a computing device.
5. The method of claim 4 wherein the likelihood of purchase is scaled by the number of sales of one of the product pair.
6. The method of claim 4 wherein the likelihood of purchase is scaled by the number of sales of the recommended product.
7. The method of claim 4 wherein the likelihood of purchase is only calculated for top selling products in each category.
8. A method to automatically link customer IDs across channels comprising the steps of:
   a. Determining a customer ID that is unique from a master data source,
   b. Creating a link table using the master customer ID and one-way hash of personal information from the master data source,
   c. Determining a one-way hash of personal identification from a second data source, and
   d. Linking the hash from said second data source to said customer ID using said link table,
   wherein at least one of the steps utilizes a computing device.
9. The method of claim 8 wherein said personal information is chosen from the group of email address, physical address, and credit card number.
10. The method of claim 8 wherein the additional step of using said customer ID to recommend a product that a person is likely to buy.
11. The method of claim 8 wherein the additional step of using said customer ID to suggest a coupon to a shopper.

12. A common core mobile app for retailers with a catalog stored in a database comprising:
   a. One or more templates to determine the graphical layout on the screen of a mobile device, and
   b. A standard data structure to link to the store's database of products.
13. The device of claim 12 wherein the mobile app is used by multiple stores owned by different retailers.
14. The device of claim 12 wherein the mobile app shows product recommendations and where the location of the recommendation in the store is displayed.
15. A method to personalize recommendations for a shopper in a store comprising the steps of:
   a. Identifying the shopper in said store before the shopper is ready to pay with a device, and
   b. Displaying personal recommendations for said shopper while shopping.
16. The method of claim 15 wherein the shopper is identified by swiping an identification card before payment.
17. The method of claim 15 wherein the shopper is identified with a mobile app that sends the shopper's identity over a network.
18. The method of claim 15 wherein the personal recommendations are displayed on a tablet held by a sales rep.
19. A method to personalize recommendations for a shopper with characteristics comprising the steps of:
   a. Determining, for a product attribute, a percentage of purchases for characteristics of customers who previously bought said product attribute,
   b. Storing the largest percentages in a list for said product attribute, and
   c. Summing percentages for said shopper characteristics that are included in said list to create a likelihood,
   wherein at least one of the steps utilizes a computing device.
20. The method of claim 19 wherein step (d) divides the sum by the number of percentages in said list.
21. The method of claim 19 wherein step (d) averages said likelihoods for all attributes belonging to a product.
22. A method to acquire customers for a retailer comprising the steps of:
   a. Registering a customer at a virtual marketplace,
   b. Obtaining preferences from said customer,
   c. Storing said registration and preferences on a server,
   d. Utilizing said customer's characteristics to determine products from said retailer that said customer would likely buy,
   e. Targeting said products from said retailer to said customer to acquire the customer, and
   f. Displaying said targeting on the customer's device.
23. The method of claim 22 wherein said preferences are specified by the customer and are product attributes that said customer likes to purchase.
24. The method of claim 22 wherein said preferences are product attributes that said customer likes to purchase, and determined from previous purchases of said customer.
25. A method to influence search results based upon shopper purchases comprising the steps of:
   a. Identifying characteristics of said shopper,
   b. Identifying products purchased by said shopper at a retail store,
   c. Identifying attributes of said products,
   d. Linking said characteristics to said attributes to create a shopping preference,
   e. Identifying characters of a searcher using a search engine, and
   f. Increasing the ranking of products in the search results that have attributes that match the shopping preferences.
26. The method of claim 25 wherein said characteristics include but are not limited to gender, age range and zip code.
27. The method of claim 25 wherein said attributes include but are not limited to price range, brand and category.
28. A method to influence search results based upon user purchases comprising the steps of:
   a. Identifying a user performing a search in the search engine,
   b. Monitoring the purchases that result from said search in retail, and
   c. Using the click-to-purchase ratio to rank search results in the search engine,
   wherein at least one of the steps utilizes a computing device.
29. A method to influence search results using a recommendation engine comprising the steps of:
   a. Tracking the search results on which users click,
   b. Calculating the related search results based upon the recommendation engine, and
   c. Increasing the rank of related search results,
   wherein at least one of the steps utilizes a computing device.
30. The method of claim 29 wherein said recommendation engine calculates related results using correlation based upon common users that click on search results.
31. A method to suggest alternative search results based upon a recommendation engine comprising the steps of:
   a. Tracking the terms that a user searches,
   b. Calculating the related terms based upon the recommendation engine, and
   c. Suggesting the related terms as alternatives to the search term,
   wherein at least one of the steps utilizes a computing device.
32. The method of claim 31 wherein said recommendation engine calculates correlated terms using correlation based upon common terms that a user searches and clicks upon at least one result.
33. A method to segment shoppers based upon a buy index comprising the steps of:
   a. Tracking the value of products that a shopper buys,
   b. Tracking the value of products that a shopper views,
   c. Calculating a buy index as the ratio of step (a) to step (b) with a threshold, and
   d. Segmenting the shoppers by the buy index,
   wherein at least one of the steps utilizes a computing device.
34. The method of claim 33 wherein the segmentation of the shopper determines whether or not to provide discounts or re-market to the shopper.
35. A method to create a dynamic website comprising the steps of:
   a. Mapping IDs to website elements,
   b. Arranging elements by the user in a dashboard, and
   c. Automatically creating JavaScript and CSS to dynamically create the desired website in the browser,
   wherein at least one of the steps utilizes a computing device.
36. A method of claim 35 wherein the mapping of the IDs is automatically performed by JavaScript.

37. A method of claim 35 wherein the arranging of elements by the user utilizes a graphical dashboard where selected ID highlight elements, and selected elements highlight IDs.
38. A method of claim 35 wherein the arranging of elements by the user utilizes criteria based upon the size of the browser window or operating system.
39. A method of claim 35 wherein the arranging of elements by the user utilizes criteria based upon the characteristics of the website visitor.
40. A method of claim 35 wherein the JavaScript from step (c) is loaded via a small JavaScript loader in the website header.

BRIEF DESCRIPTIONS OF DRAWINGS

Figure 8A:
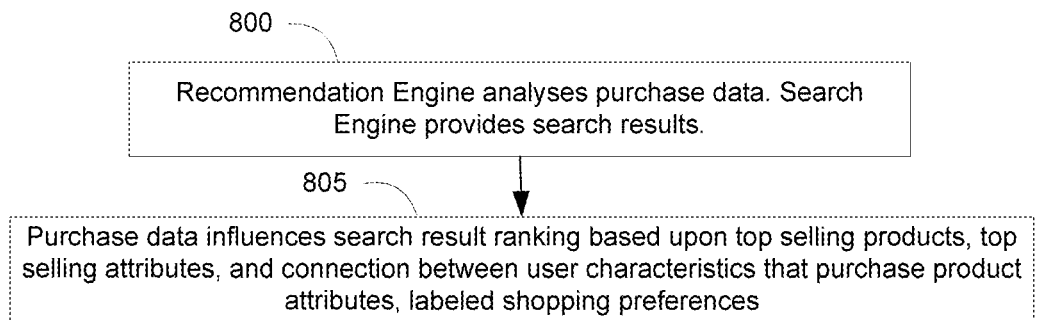
Figure 8B:
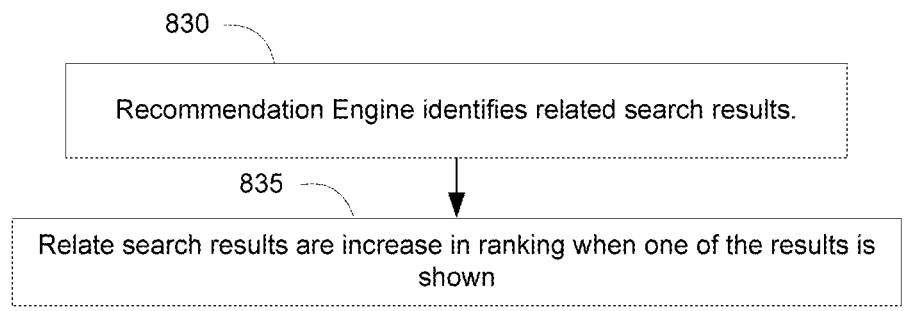
Figure 8C:
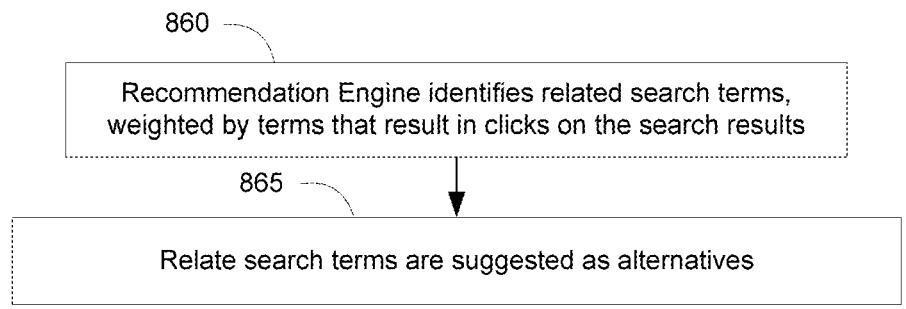

FIGS. 8A, B and C show the ability of a recommendation engine to influence search engine results using retail purchase behavior.

Figure 9:
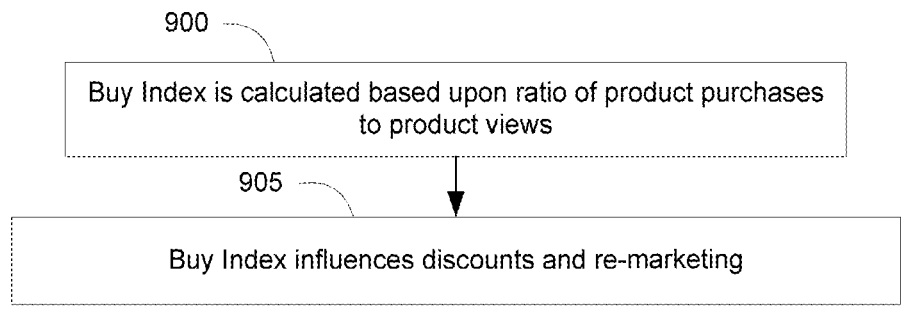

FIG. 9 shows the calculation and usage of a shopper buy index for discounts and re-marketing.

Figure 10A:
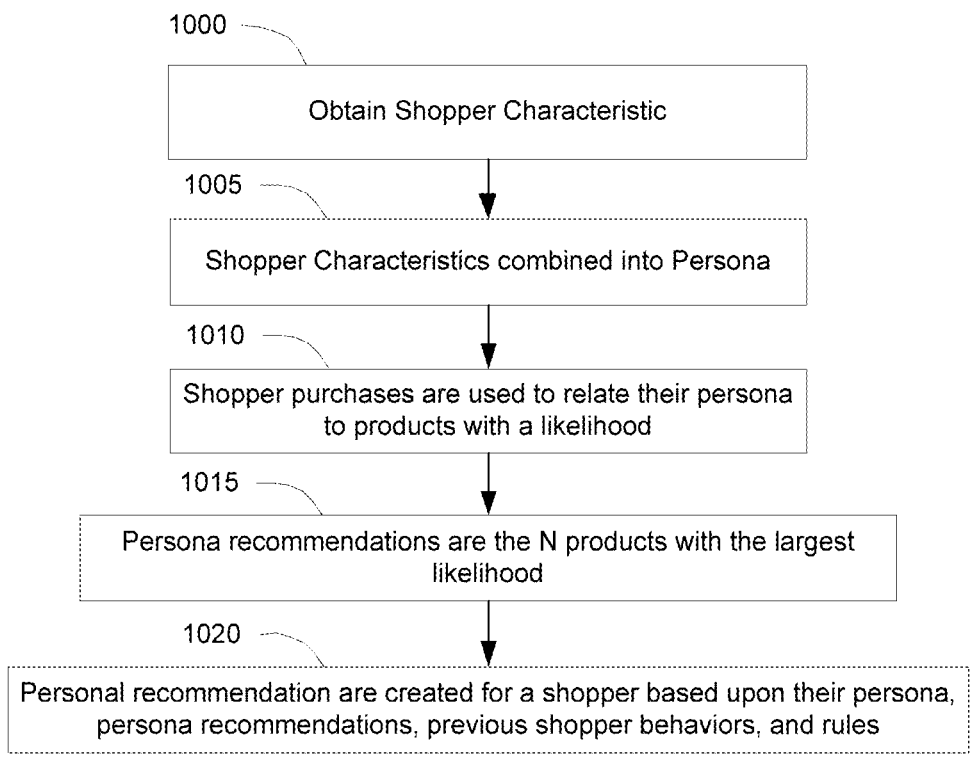

FIG. 10A shows the process to utilize a shopper's persona to create personal product recommendations for that shopper.

Figure 10B:
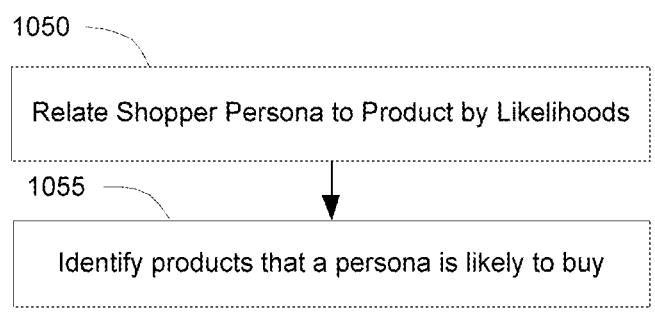

FIG. 10B shows the process to utilize a shopper's persona to find shoppers likely to purchase a product.

Figure 11:
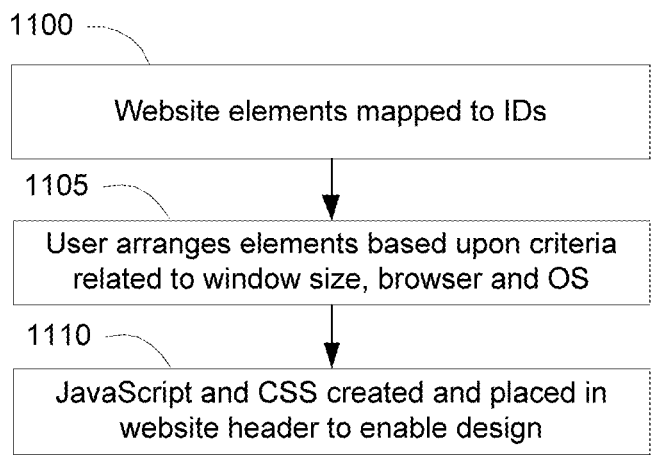

FIG. 11 shows the process that allows a non-technical person to create a dynamic website, typically for a responsive or mobile website.

DETAILED DESCRIPTION OF THE INVENTION

Terminology

Regarding terminology, items include products, news, articles, items, songs, movies, images, web pages, etc. The terms products and items are used interchangeably. Users include customers, consumers, recipients (such as for email), shoppers, or anyone browsing or interacting with the web page, website, or any item. These terms are also used interchangeably. Websites and web pages are not limited to their current implementation, but also refer to information that is available through a network to any device, including computers, televisions, mobile phones and other mobile devices (e.g. iPad). Actions include purchases, plays, rentals, ratings, views, reading an article, downloads, or any other usage or action, unless specifically limited. Actions and purchases are used interchangeably. Social networks or social media are services like MySpace or Facebook, where users have a profile and interact with other users, either directly, or within groups. Mobile commerce is the purchasing of products on mobile devices, usually cell phones or smart devices, such as an iPhone or Android. Attributes are characteristics of items or users, such as category, brand, collection, weight, color, gender, and so on. Crowd based recommendations are based upon the activities of users directly on the items, e.g. 'Customers who bought this, also bought these'. Genomic based recommendations, previously called categorical recommendations in patent application Ser. No. 12/764,091, are based upon activities on the item's attributes and then applied to the target item. Recommendations and analytics can be used interchangeably since recommendations are automated, intelligent and predictive analytics. Social graphs are lists of friends and interests for each user in a social network. The friends can be ranked with a hierarchy or groups, or not. Similar items are recommendations for products that are similar to the currently viewed product. They convert browsers to buyers by showing them something they may by if they don't like the current product. Similar items can also be called up-sell, especially if arranged by price. Cross-sell items are recommendations for products that are bought with the currently viewed product. Personal items are recommendations of products that the user would enjoy, and have been called likely items and personalized items in the past. Personal items, personalized items and likely items are used interchangeably. They are different than personalized cross-sell or personalized similar, where, in this case, the term personalized refers to changing the cross-sell or similar recommendations to be unique for that shopper influenced by past or current behavior, but always remaining a cross-sell or similar recommendation to the target product. In fact, the term personal is now being used to differentiate from personalized cross-sell and personalized similar.

1. Recommendations for Inside Sales

An inside sales person uses customer relationship management (CRM) software, such as Salesforce.com, Zoho, or SugarCRM, to call prospects. When the sales person is contacting the prospect, the recommendation solution displays the products the prospect is likely to buy and products that they have already bought in the CRM window. It is displayed as a popup or frame like recommendations are displayed on the retail website for consumers.

Figure 1:
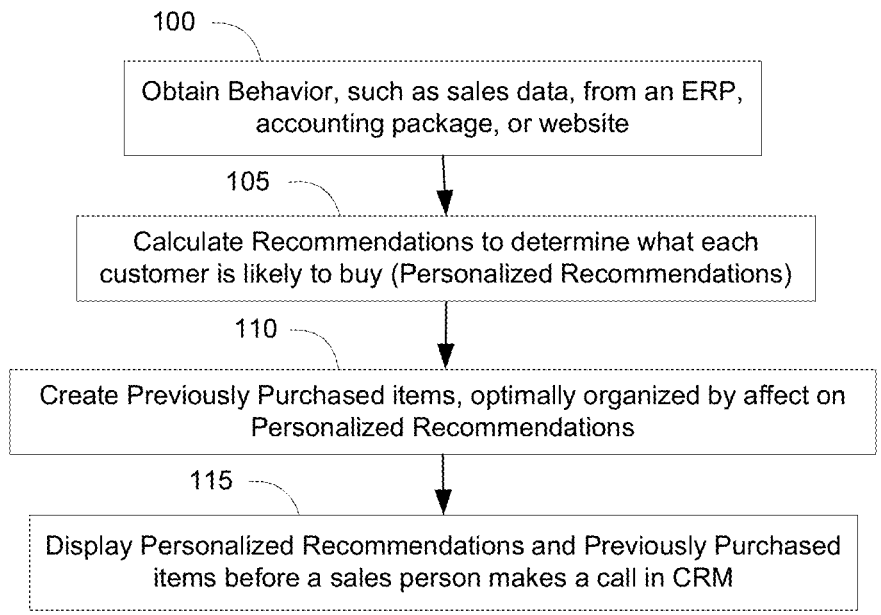
FIG. 1 shows the process for personal recommendations for inside sales using a CRM.

As shown in FIG. 1, the recommendation solution obtains the behavior, such as sales data and view data, to create the recommendations from other systems, such as the website, accounting or enterprise resource planning (ERP) software. It processes the data to create recommendation for what each customer is likely to buy (a.k.a. personal recommendations), such as described in the patent application Ser. Nos. 12/764,091, 13/107,858, and 13/492,859, previously incorporated by reference.

A table or database of what products each customer bought is also created. In addition, optimally, the previously purchased products are sorted by their effect on all of the recommendations. Specifically, each purchased product has a likelihood of causing the purchase of each recommendation. The likelihood is summed if the purchased product has a likelihood of causing the purchase with more than one purchased product. The previously bought items are listed by the summed likelihood.

Alternatively, the likelihood for each recommendation is used separately and the previously purchased products are sorted by this likelihood. In this case, the previously purchased products are listed in different order for each recommendation. This requires the sales person to click on the recommendation to see why it is being recommended, labeled why items. Creating 'why items' is discussed in the previously incorporated applications.

The recommendations are displayed in the CRM, such that during their call to the prospect, the sales person can say "you might like this item since you've bought items A and B from us in the past". It has been shown that letting a prospect know why items are being recommendation increase the chance that they will buy the recommendation.

The recommendations are best if the prospect has bought items from the company that the sales person is representing. However, this is not critical, as genomic recommendations, those based upon customer profile or attributes, can be used. Preferably the profile uses sales data, such as prospects with this trait (e.g. from this location) often buy product X, as discussed in the incorporated applications and below in this application.

2. Improved Genomic Cross-Sell

Products have several attribute types, such as category, manufacturer (a.k.a. brand) or activity. Products can belong to several attributes (previously known as attribute elements), such as categories like men's shirts, and dress shirts, or one attribute, such as manufacturer like Columbia Sportswear. For clarity, this specification assumes that the products have two attribute types, category and brand, where products can belong to many categories and one brand. It is easily extended to multiple attribute types.

Genomic cross-sell recommendations are used for products that have not sold or have very few sales. This means that recommendation solutions cannot find enough products that have sold with the primary product (e.g. the product viewed on the website) for cross-sell. Midsize retailers have 80% of their inventory with no or few sales.

The problem is that retailers export very high level categories (e.g. men's clothing). These categories are often bought with themselves, and the top selling product in this high-level category is recommended too often. It is optimal to export high level categories since they are good for showing category top sellers. For example, what is the top selling men's clothing?

Figure 2:
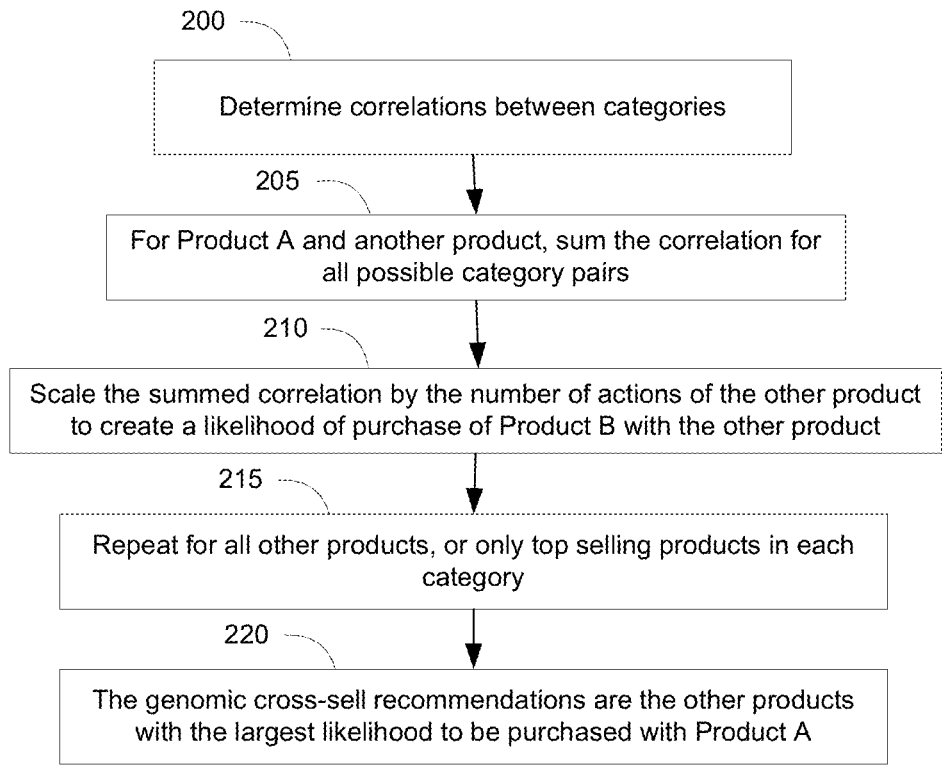
FIG. 2 shows the process for improving genomic cross-sell by summing correlations of category pairs.
Figure 3:
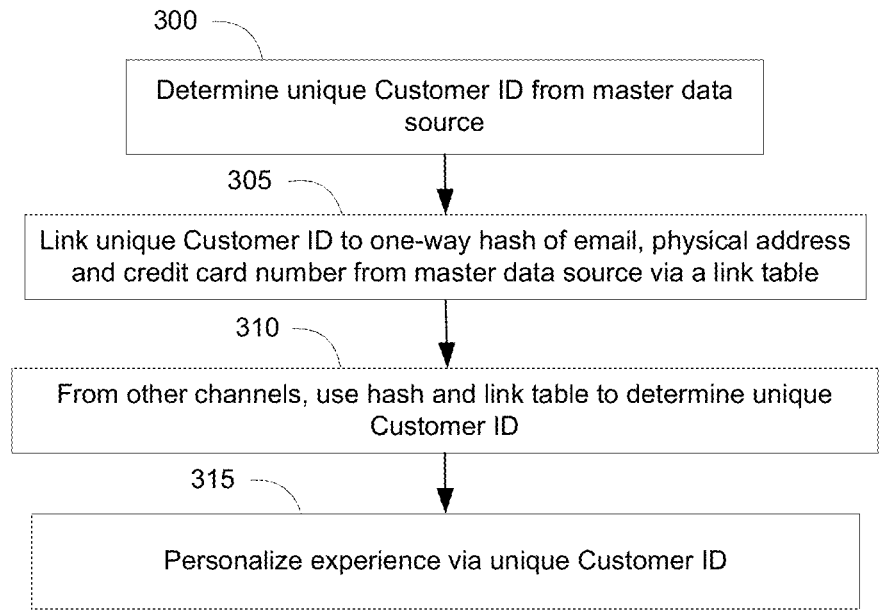
FIG. 3 shows the process for cross-channel personalization using a link table between a customer ID and personal information.
Figure 4:
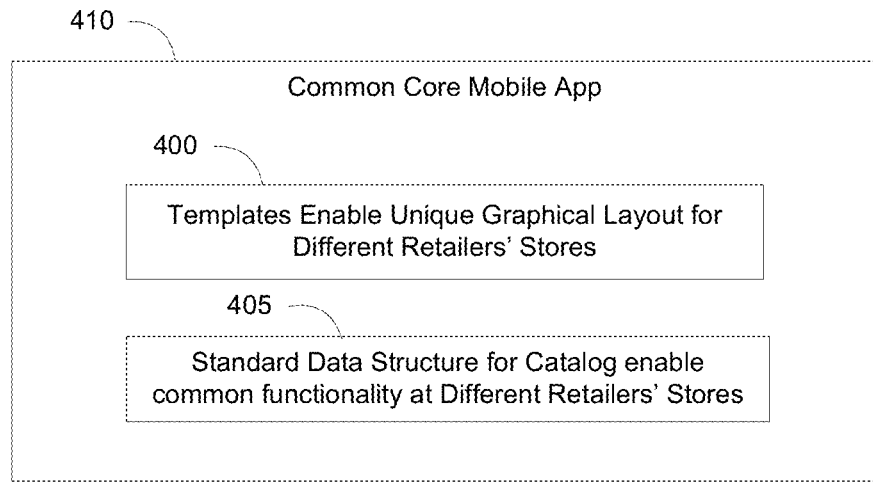
FIG. 4 shows the architecture for a mobile app with a common core for usage in multiple stores.
Figure 5:
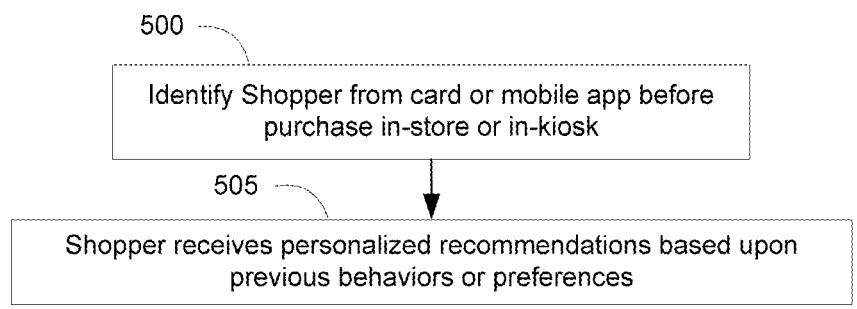
FIG. 5 shows the process of identifying a shopper before the pay for an item so recommendations can be personalized.

There are two novel approaches for genomic cross-sell. As shown in FIG. 2, they both share the concept to show products that share many categories that are bought together, not just one. This removes the effect of a high level category since it's included in for every product pair, and overshadowed by lower level categories (e.g. men's dress shirt). The correlation between category pairs is calculated by any method. This novel calculation sums the correlation between categories, scaled by the sales of the recommended product. This novel approach has additional benefits. It easily scales to numerous attributes, and the attributes can have multiple elements (e.g. men's dress shirt, men's long sleeve shirt, men's button down).

Embodiment A is a brute force method. For each product, the method examines each other product, determines every category pair for the product pair, and sums the correlation for each category pair that is bought together.

More specifically, genomic cross-sell is calculated by adding the correlation of every attribute element combination for the two products and multiplying by the log(product sales)/log(max product sales). The log is used since it increases the effect of the attribute correlation rather than number of sales.

This is repeated for each product pair. The implementation uses an upper triangle for the product pair matrix: i=0 to numItems and j=i+1 to numItems. The resulting likelihood is added to genomic cross-sell for both pairs since it's symmetric. Business rules are executed on each pair since they are not symmetric. In other words, to slightly decrease computation complexity, it looks at each product pair in both directions, meaning the solution determines if product B should be recommended with product A, and if product A should be recommended with product B. This reduces the calculation by half.

For each product pair, the correlation for each category pair is calculated, where, if both products have the same category, the self-similarity is used for the category. The category pairs are not removed if calculated before as the mirror (e.g. category pair a-b and b-a are both included). For example, if product A has categories a and b, and product B has categories a and b, the correlation for category pairs a-a, a-b, b-a, and b-b are summed. This is equivalent if product B had categories c and d, where the correlation is summed for category pairs a-c, a-d, b-c and b-d. If product A has categories a and b, and product B has category a, the correlation for category pairs a-a and b-a are summed.

Since the products contain more than one attribute type, the algorithm multiplies the attribute 1 summed correlation by attribute 2 correlation. This is the preference. If not enough recommendations can be calculated, products with only matching attribute 1's are shown and then products with only matching attribute 2's. This process can easily be expanded to numerous attributes, and, if the additional attributes have products that belong to multiple attributes, the summed correlation is used in the multiplication.

Embodiment B is less complex than embodiment A. It is also slightly less mathematically accurate (which likely does not affect the recommendation's relevance since we are dealing with behavior).

In embodiment B, the calculation is similar to pages 22-24, 54-57 and FIG. 2H of patent application Ser. No. 12/764,091, previously incorporated by reference. However, the method requires that the likelihood of the category pairs is added for the product pair, and the recommendations are created after this sum has been calculated for each top seller in the correlated category for all top correlated categories. Specifically, step 296 of FIG. 2H of Ser. No. 12/764,091 is sum for each category and multiply for each category type.

In other words, for each base category for product A, the likelihood for each top seller item for each correlated category (i.e., likely to be bought with said base category) is calculated with a formula using the correlation between the category pairs and number of sales of the top seller. If a top seller item is a match for more than one correlated category, the likelihoods are summed for each category pair, and the recommendation is determined after all (or at least multiple) category pairs are calculated. The log of sales for the top seller item is used to lower the influence of top sellers on recommendations.

For the two attribute types, the results are multiplied, as discussed for Embodiment A. If there are more, all results are multiplied, and, for attribute types with products belonging to multiple attributes, the correlations are first summed.

In the novel Embodiment B, the site-wide top selling item gets a large likelihood from the top level category, but not from lower level categories. For example, assuming dress pant categories are all correlated with dress shirt categories, when buying a men's dress shirt, a top selling dress pant in men's clothing, men's pants, and men's dress pants sums the correlation for all three categories with the dress shirt categories. If the top selling item in the store is a men's shirt (with 2X sales of the top selling dress pants), the dress pants still results in a stronger correlation than the top selling men's shirt due to summing all three categories.

In the implementation, for product A, a list of all other products is kept, with correlation initially set to 0. Each correlation is added to the list, and then the list is organized into the top related items to determine the results. The relationship is looked at in both directions (product A with B and product B with A) to be more efficient (as discussed with Embodiment A).

3. Automatically Link Customers Across Channel

A problem with recommendations is that customers shop online via their computer and phone, as well as in the store in person and with mobile applications, where each mode of shopping is known as a channel. It is optimal to automatically track the behavior of the shopper across these channels.

The preferred embodiment is to use personal information, such as email address, physical address, or credit card number to link shoppers to a unique, persistent customer ID, where the customer ID cannot be used to identify the person.

Preferably, a one-way hash of the personal information is used to respect privacy. In other words, a one-way hash of your email is unique and persistent. If you give me your email, I can determine which hash is yours. However, if you give me the hash, I don't know the email (and your privacy is respected).

Specifically, the embodiment automatically links the identifiers as follows. From a master data source of customers, such as from the website, ERP or accounting software, a unique customer ID is determined for each customer. It can be determined from the master database, or created by the recommendation engine. This unique customer ID is created with the personal information, e.g. hash of the email, address and/or credit card number from the master data source, and used to create a link table that relates the customer ID to the personal information. For other data sources, the hash of any element is taken, and the user linked to the unique customer ID via the link table. The other data source don't need to have the customer ID, as it can be determined from the hash and customer ID lookup that converts the hash to a customer ID. Furthermore, the master database may link the unique customer ID and email hash, while the other data source links the unique customer ID and credit card hash.

The embodiment optimally uses a normalized database where the link table consists of unique customer ID as the unique key and one piece of personal information for each entry, with multiple entries for multiple pieces of personal information. This enables an unlimited number of hashes can be linked to the customer ID. The alternative approach is a link table or database with a fixed number of alternative hashes.

The hash of personal information can include the street address, street address and zip, street address and state, or any other combination can be used. Similarly, the credit card hash may or may not include expiration date—preferably not so it persists when issued a credit card with the same number after expiration.

The additional personal information (known as alternative IDs) is used for both the generation and display of recommendations. Implementation can either check to see if the ID is the unique, customer ID for a direct lookup or recommendations, and then check the link table, if the ID does not exist—or check the link table first, then lookup the recommendations using the customer ID from the link table or original customer ID if no entry existed in the link table.

A likely scenario is that website data is used as the master database. The customer ID is determined from the website data, and a hash of the email address and combination of street and state is created from the website and linked to the customer ID in the recommendation engine. This preferably uses table storage for speed, rather than a relational database. Then, in the store point of sale (POS) solution, the customer has provided an email address for coupons, so in-store sales are linked to the email hash. The recommendation engine converts the email hash to the customer ID for the sales data to improve the calculation of recommendations. Furthermore, the user checks a price on their smartphone using an in-store app. The engine converts the email address registered with the in-store app to the customer ID to personalize recommendations shown to the user on the smartphone.

Since the website may not store the credit card, its hash is not determined by the website. However, if the store has an affiliate program, the credit card hash is linked to the website's customer ID via the affiliate card database.

Furthermore, a persistent cookie ID saved on the shopper's computer can be linked to the customer ID when the user logs on, and all previous browsing behavior is linked to the customer to further improve recommendations. This requires either changing the cookie ID to the customer ID in the historical data, or, preferably, linking the cookie ID to the customer ID in the recommendation data table.

The recommendations are cross-channel and automatically converted to identify the customer for that retail store, preferably while respecting their privacy. Optimally, the customer data table includes an opt-out or opt-in field where the user can block cross-channel tracking.

The recommendation engine could be any promotional tool, such as a coupon system, that works cross-channel. In other words, this solution is not specific to recommendation technology.

4. Common Core for in-Store Apps

Many large stores, and, in the future, all stores will include a mobile application to help shoppers and sales reps in the store. The application could run on a smartphone or tablet PC. The tablet is more likely to be used by the sales rep.

It will become expensive to develop unique applications for each store owned by a different retailer and require the user to download an app for each store owned by a different retailer. Since much of the functionality is the same for each application, a core application is developed with the base features being the same for each store. The core application is customized for the store by adjusting a template for a unique graphical display, and linking to the stores database to a standard data format, such that minimal changes are required to the application for each retailer. In addition, the application optionally allows the shopper to select the store (or automatically select the store using GPS and store locations) such that one application works in many stores.

The application links to the stores data, such as Enterprise Resource Planning (ERP) system, to determine the catalog, locations of items in stores and real-time inventory levels. The application includes a standard data format that it converts the data to from the stores database. The standard data format includes product ID, name, price, sales price, list price, image location, inventory level, recommended items (optional for static recommendations), ratings and reviews, and backorder date. This data is optimally obtained in real-time with calls to the store's database. Alternatively, the stores database can be converted as a complete dataset periodically, like every hour or when an inventory level changes.

The key features in the app are:
- Product search which shows the aisle of the product, and includes a map when in-store GPS is working
- Personalized cross-sell and similar recommendations to a target product (e.g. what the shopper is currently looking at or just scanned) with prices and aisle locations for each recommendation
- Wish lists
- Ratings and reviews of products
- For out of stock products, back order capabilities with arrival dates and inventory in other stores In the end, the same core app is developed for different stores or chains by changing the template and database link. The development is reduced and the shopper can use the same app in numerous stores or chains owned by different retailers.

5. Personal in-Store or in-Kiosk Recommendations

Pages 83 to 90 of patent application Ser. No. 12/764,091, already incorporated by reference, discusses using affinity cards to show recommendations. This novel invention enables recommendations before the time of payment by reading the card before payment or using a mobile app that sends the affinity information when near or in the store, or while shopping with a mobile payment solution.

When a shopper comes into a store the sales person or kiosk can ask to read their affinity card or credit card to determine the shopper's identity. This could require a swipe for a magnetic card or remote reader for a smart card. Alternatively, a mobile app can send the shopper's identity when the shopper is near, enters, or is inside the store. Furthermore, a camera in the store with face recognition or any biometrics can be used to identify the customer, optionally with their previous consent or 'opt-out' filed with the store.

Once the shopper's identity is known, the recommendations are personalized to the shopper based upon their previous purchases, preferences and characteristics. These previous behaviors have been saved and/or processed by the recommendation algorithm to personalize the recommendations.

For example, the shopper may be offered a pair of pants that the system determined they will like since they've bought a shirt and jacket that are often bought with those pants. Before the shopper entered the store, the shopper's ID had been linked to these pants when the recommendations were created. Alternatively, the previous purchases are sent to the algorithm to influence the recommendations when the shopper is looking at a specific item.

The recommendations can be displayed at a kiosk in the store, point of sale screen or printout, a tablet held by an employee or the shopper (using the store's WiFi), or a mobile phone app utilized by the shopper. The shopper is provided these recommendations before paying. The recommendations can be emailed or texted to the shopper.

The store sales rep can be wondering the store with a tablet that includes a payment processing device. In this case, the sale rep can provide recommendations at the time of payment since the shopper is still wondering in the store. The sales rep can also learn the shopper's name and address them by name.

The store could be a kiosk, such as when renting a movie from a kiosk like Redbox. In this case, you have the kiosk read your credit card or identity you via a mobile app at the kiosk before looking at movies. This enables the kiosk to personalize your suggestions. The kiosk can start with a list of movies that the shopper is likely to enjoy.

6. Shopper Preferences and Characteristics and Personal Recommendations

At pages 28 to 30 of patent application Ser. No. 13/492,859, already incorporated by reference, there are algorithms to relate shopper characteristics (called attributes in that application) to product attributes to help new shoppers buy new products. This application explains novel methods to utilize shopper preferences, and relate new shoppers to existing or new products.

Shopper Preferences

Figure 6A:
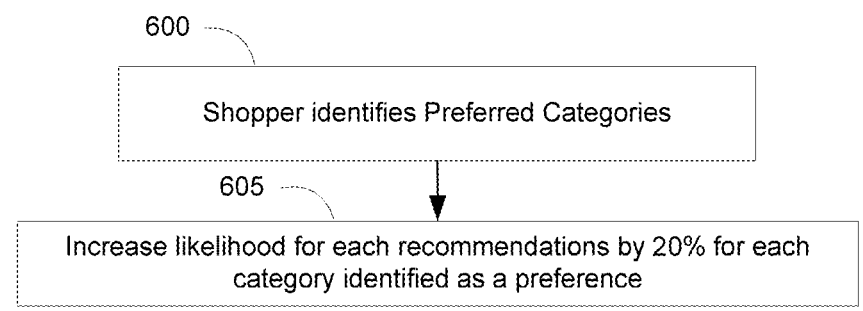
FIG. 6A shows the process of utilizing a shopper's preferences to personalize recommendations.

As shown in FIG. 6A, shoppers identify preferences that relate to categories of products. Then, when recommendations are from that category, they are promoted to a more prominent location in the recommendation list. The recommendations have a likelihood of purchase, which is increased by 20% for each preferred category. This personalizes the recommendations, by ordering them by the likelihood.

For example, a customer states that they like dogs at a pet store. When shopping for a dog bowl, the first recommendation is a cat bowl since many people are buying the matching cat and dog bowls with a likelihood of 12%. The second recommendation is a dog food with a likelihood of 11%. Since the customer states that they like dogs, the dog food is promoted by 20%, and it results with a likelihood of 13.2% and is shown in first place. In this case, the shopper has shown interest in the dog bowl by looking at that product.

Figure 6B:
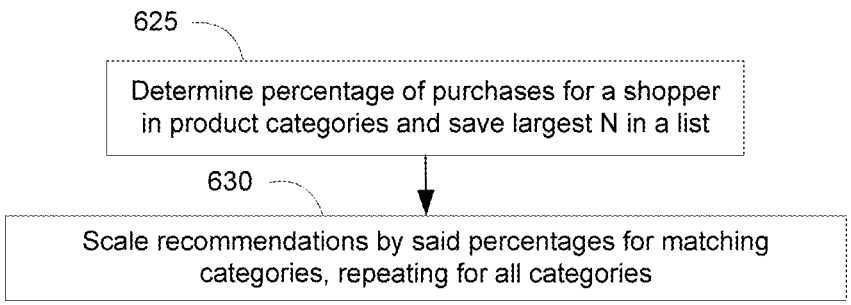
FIG. 6B shows the process of utilizing a shopper's purchases to personalize recommendations.

In addition, as shown in FIG. 6B, customers buying habits are tracked to each category, and the recommendations are influenced by said relationship. For a customer, the percentage of purchase for each category is calculated. The top N, usually 20, categories of the customer's purchases are saved in a list by the order of the percent of purchases. The results can sum over 100% since products belong to several categories. Each recommendation's likelihood is increased by the percentage of purchase by the shopper for each of the products categories.

Using the example from above, if shopper A buys 20% in category dogs and 10% in category food, the dog food recommendation's likelihood is increased by 20% then 10%, or visa-versa depending upon which category is listed first (which is the same due to the distributed law of multiplication). The resulting likelihood is 14.52%. Alternatively, the likelihood is increased by 30%, resulting in a likelihood of 14.3%. This method requires summing all categories and then multiplying.

Alternatively, if a shopper buys a lot in one category the recommendations from that category is increased by 20%. For each shopper, the top 5 or 10 categories are saved, where the categories include those chosen by the shopper and based upon purchases, preferably in the order of selected preferences then preferences based upon purchases.

Furthermore, if a shopper says they don't like rats, the likelihood of a product for rats is set to 0 or greatly decreased. Similarly, if a shopper has never bought products for a rat, the likelihood is decreased by an amount proportional to the number of purchases of the shopper.

Genomic Personal A

Figure 6C:
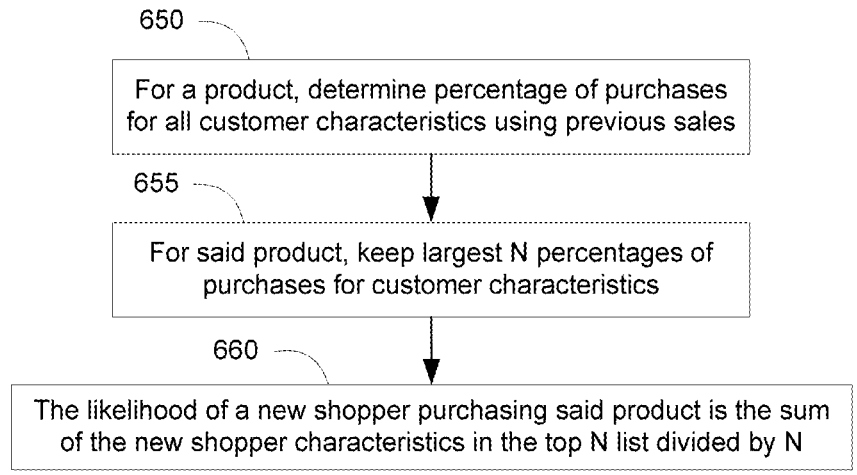
FIG. 6C shows the process of utilizing a shopper's characteristics to personalize recommendations.

As shown in FIG. 6C, for a new shopper, defined as a person who has not bought or viewed anything at the store, the characteristics of the shopper are used to determine which products that shopper will buy. The characteristic types can be any information, such as gender, location of home, age bracket, etc. The characteristics are the entries, such as male or female for gender, or zip of home. When a shopper with a characteristic buys a product, the purchase links the characteristic and product, and is used to calculate the likelihood of a shopper with that characteristic to purchase that product. The likelihood is the sum of purchases for all shoppers with that characteristic divided by the total sales of that product. The example below has a first table showing the sales being applied to shopper characteristic, and the second table shows the likelihood.

TABLE 1

Applying shoppers' purchases to link characteristics and products to determine likelihood of purchase.

|  | Belt A (SKU = 123) | Belt A (SKU = 321) |
|---|---|---|
| Male Shopper | 50 sales | 5 sales |
| Female Shopper | 10 sales | 55 sales |
| Total Sales | 60 sales | 60 sales |

TABLE 2

Calculating likelihood of purchase for any shopper with these characteristics.

|  | Belt A (SKU = 123) | Belt A (SKU = 321) |
|---|---|---|
| Male Shopper | 83% (=50/60) | 8% (=5/60) |
| Female Shopper | 17% (=10/60) | 92% (=55/60) |

The largest N likelihoods are stored for each characteristic type in a recommendation list for each product. For a shopper, the likelihood of purchasing a product is the multiplication of the percentage of purchase for each of the characteristics of said new shopper. If the characteristic is not in the list, either one tenth of the smallest percentage is used or 0. Alternatively, the likelihoods can be is the addition of the percentage of purchase for each of the characteristics of said new shopper from the list divided by the number of characteristics used. In the preferred embodiment, N is 20. This process is repeated for each product to determine the M (usually 20) products that the new shopper is likely to buy.

For example:
Product A has 90% of purchasers are male, 20% from CA, 10% from OR, 50% are over 50, and 10% are under 20.
Shopper 1 who is a male from CA over 50 is 9% (=90%*20%*50%) likely to buy product A.
Shopper 2 who is male from WA and under 20 is 0.9% (=90%*10%*10%) likely to buy product A.

Genomic Personal B

Figure 6D:
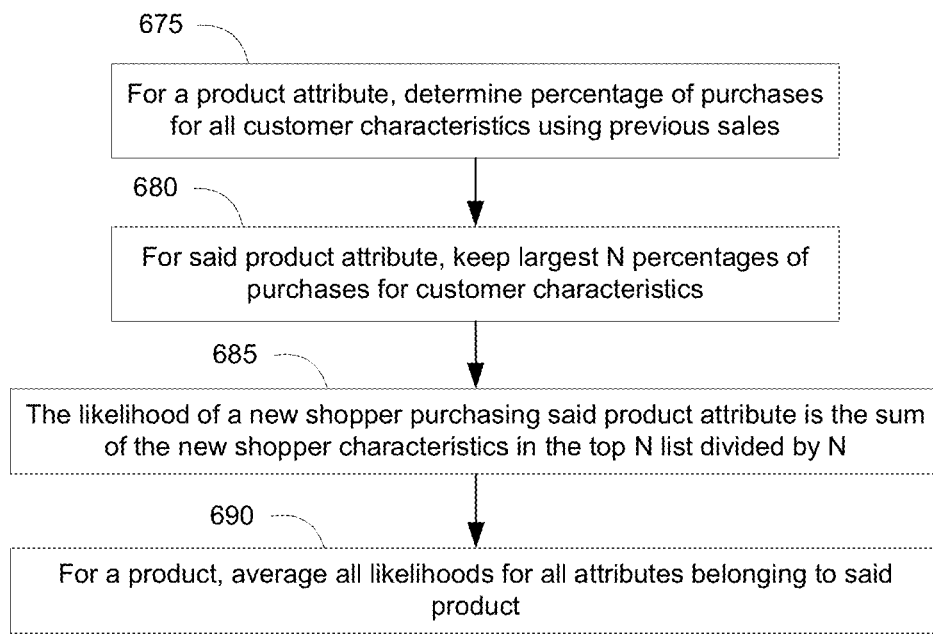
FIG. 6D shows the process of utilizing a shopper's characteristics and product attributes to personalize recommendations.
Figure 7:
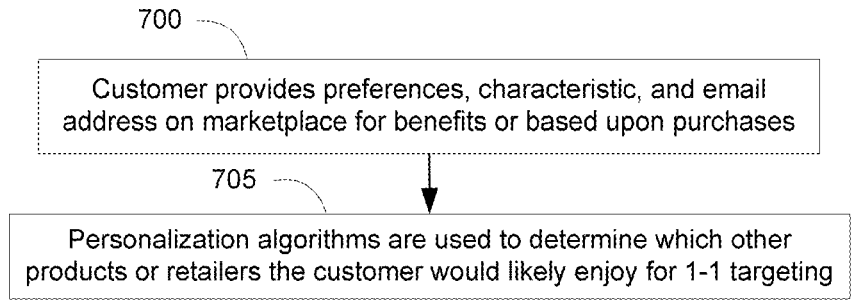
FIG. 7 shows a process to use a market place for customer acquisition.

Furthermore, as shown in FIG. 6D, the shopper's characteristics can be related to the product's attributes (e.g. categories) to determine the likelihood of buying a product, even if the product has not sold and the shopper has not bought anything. For a product attribute, the likelihood of purchase for the each shopper characteristics are calculated based upon previous sales data, and the largest N are saved in a recommendation list. Each shopper purchase of a product applies the purchase to that shopper's characteristics to that product's attributes. For example, if a shopper that is male and over 50 bought a product that is a dress-shirt and button-down-shirt, a sale is applied to (i) male and dress-shirt, (ii) male and button-down-shirt, (iii) over 50 and dress-shirt, and (iv) over 50 and button-down-shirt.

Specifically, for a characteristic-attribute pair, the purchases are summed for each shopper with the characteristic and each product with the attribute. The likelihood is the sum of purchases for all shoppers with that characteristic divided by the total sales of the product attribute. The example below has a first table showing the sales being applied to shopper characteristics and product attributes, and the second table shows the calculation of likelihood of purchase between shopper characteristics and product attributes.

TABLE 3

Applying shoppers' purchases to link shopper characteristics and product attributes to determine likelihood of purchase.

|  | Attribute A | Attribute B |
|---|---|---|
| Male Shopper | 200 sales | 40 sales |
| Female Shopper | 50 sales | 220 sales |
| Total | 250 sales | 260 sales |

TABLE 4

Calculating likelihood of purchase for any shopper with these characteristics for a product with these attributes.

|  | Attribute A | Attribute B |
|---|---|---|
| Male Shopper | 80% (=200/250) | 15% (=40/260) |
| Female Shopper | 20% (=50/250) | 85% (=220/260) |

The likelihood of purchasing that product attribute is the multiplication of the percentage of purchase for each of the characteristics of said shopper in the recommendations list. Alternatively, the addition of the percentage of purchase for each of the characteristics of said new shopper in the recommendation list for said product attribute divided by N. In the preferred embodiment, N is 20.

Then, the results for each attribute of a product are averaged to determine the likelihood of the shopper buying that product. Alternatively, these percentages related to attributes could be multiplied. Averaging is preferred because it is assumed that the categories are statistically related and not independent. For example, the categories of a dress-shirt and button-down-shirt are related. If different attribute types, such as brand and category are used, multiplication is used to merge the likelihoods since these types are independent. This process can be repeated for each new product or products with low sales volume to determine the M (usually 20) products that the new shopper is likely to buy.

For example, a product X has attribute 1 and attribute 2.
For product attribute 1, 90% of purchasers are male, 30% from CA, 25% from WA, and 70% are over 50.
For product attribute 2, 70% of purchasers are male, 40% from CA, 25% from WA, and 50% are over 50.
As such, a shopper who is a male from CA over 50 is 18.9% (=90%*30%*70%) likely to buy a product with attribute 1, and 14% (=70%*40%*50%) to buy a product with attribute 2, resulting in 16.5% [=(18.9%+14%)/2] likely to buy product X.

Hierarchy

When creating a list of products that a customer is likely to buy or a list of customers likely to buy a product, genomic personal recommendations are listed after personalization based upon previous sales data, with genomic A ranked higher than genomic B. As expected, genomic A does not exist for a new product. Specifically, if a person buys product B, which is bought with Product C and D, product C and D are listed and then genomic personalization.

Implementation

The preferences and purchases are saved on one or more servers, and the recommendations are shown on the shopper's device. The same or other servers post the website.

7. Recommendations by Persona

The previous section explains a novel method to use shopper characteristics for recommendations, and this section shows another novel method of combining shopper characteristics into a persona for recommendations.

Personal Recommendations by Persona

As shown in FIG. 10A, the method below is a novel alternative to Genomic Personalization A in the previous section (i.e. section 6) of this application. A shopper has characteristics, such as gender, age range, location (e.g. zip code, state, or province), income, car ownership, favorite movies, artists (any attribute that you can track via a social network such as Facebook). Characteristics with numerous entries, like car ownership or favorite movies, can use a higher level element, like car manufacturer, movie genre, movie director, movie actor, to have more actions per characteristic. These characteristics are combined to create a shopper persona, and used to create recommendations for shoppers that don't have purchase or view behavior. This is important when a shopper first lands on a site or for emails to prospective customers.

The process to create the recommendations is as follows. First, as shown in box 1000, customer characteristics are exported to our system. The characteristics are obtained from the customer profile in the shopping cart, email platform, ERP, Facebook and/or Google account. When a customer uses Facebook or Google to log onto a shopping site, the public information is obtained and exported with the other customer characteristics. In our preferred embodiment, the customer characteristics is exported by month, and customers are included in the export if they've changed their data during that month, made a purchase, or viewed a product.

Second, as shown in box 1005, the customer characteristics are combined into a Persona with rules that the retailer can change. The standard persona includes gender, age range and location. For example, a persona for a 55 year old male from Washington is 'Male-50to60-WA'. In another example, a 33 year old woman from Oregon has a persona of 'Female-30to40-OR'. If there's a missing characteristic, the term 'NoEntry' is used, and all shoppers missing that characteristic are grouped together. Other terms can be used to group these shoppers.

In addition, a secondary persona is the location. This is used since the location of anonymous web shoppers is found via their IP address. Thus, the system personalized for anonymous web shoppers based upon location. The location can be state, providence, zip or first three digits of zip.

The terminology can change across stores, such that store A uses male or female, 10 year age ranges, and states, whereas store B uses man, woman, or child, preset age ranges (e.g. 0-10, 11-20, 21-30, 31-50, 51-100), and first three digits of the zip code. It is ideal for all stores to use the same persona terms so that information about shoppers can be used across stores, assuming that the shopper does not select 'DoNotTrack' and the store allows data sharing with other stores, usually anonymously and in-aggregate.

This becomes extremely useful when shopper persona is linked to product attributes (e.g. categories and brand), where all stores uses a fixed set of attributes, since the stores may not share products, but they do share product attributes.

In addition, the retailer can setup rules for persona, such as use gender, location and income range rather than the standard of gender, location and age range.

Third, as shown in box 1010, shopper behavior is used to relate their persona to products. In the preferred embodiment, a shopper's purchase of a product counts as a purchase for the persona for that shopper. If a shopper purchases a product N times or more, where N is usually 3, only N purchases are counted. If the product has been bought by a different shopper with the same persona, the purchases are summed. The summed purchases are divided by the total number of purchases for shoppers with said persona to provide a likelihood of purchasing that product (assuming the shopper makes a purchase). This number is similar to the cross-sell likelihood, which shows that 5% of shoppers who bought product A (i.e. shopper made a purchase) also bought product B.

Alternatively, the summed purchases can be divided the total viewed products for shoppers with said persona to provide a likelihood of purchasing that product for a shopper with said persona.

Fourth, as shown in box 1015, the M products, where M is usually 20, with the largest likelihood for each persona are the persona recommendations.

Fifth, as shown in box 1020, the shopper's persona is determined and the recommendations for that persona are used as a base for that shopper as personal recommendations. The previous purchases and recently viewed products for the shopper influence the recommendations. For example, a persona recommendation that the shopper recently viewed is increased in likelihood for that shopper. The shopper may have rules, such as only show products for a female or dog-lover, and these preferences change the likelihood of the persona recommendations for the shopper's personal recommendations.

Personal Recommendations Based Upon Recently Viewed Items

In addition to using persona, recently viewed items are used to create personal recommendations. The cross-sell recommendations for the products that shopper recently viewed are personal recommendations. The similar recommendations for the recently viewed products can also be personal recommendations, or used instead of the cross-sell recommendations for recently viewed products. These recommendations are lower priority than cross-sell of previously purchased items since they are based upon view data rather than purchase data.

In the preferred embodiment, the last 10 weeks of viewed data is used to determine combined cross-sell (same as likely items is created for previously purchased items). The combined cross-sell sums likelihood for a recommendation that is a cross-sell for more than one recently viewed item.

Hierarchy

In the complete system, the persona recommendations are one type of personal recommendations. The personal recommendations are based upon purchases, view data and persona. In the preferred embodiment, if the shopper has previously purchased products, the personal recommendations are the likely items (a.k.a. summed cross-sell recommendations) for said purchased products (see page 7, lines 29 to 32, for application Ser. No. 12/764,091). If a personal recommendation is also a cross-sell recommendation for a recently viewed product, the likelihood is increased by adding the cross-sell likelihood (see page 20, lines 3 to 22 of application Ser. No. 13/107,858). If a personal recommendation is a persona recommendation, the likelihood is increased by adding the persona likelihood. This summing of likelihoods is repeated for all personal recommendations, cross-sell recommendations for all viewed products, and all persona recommendations.

If not enough personal recommendations can be created, personal recommendations based upon recently viewed items (as discussed in the previous sub-section) are used.

If still not enough personal recommendations exist, the persona recommendations for the persona of the shopper are used.

As such, the recommendation list is ordered by type of personal recommendation, and within each type the recommendations are ordered by likelihood. In other words, the likely items are always in front personal recommendations based upon recently viewed items, which are always in front of persona recommendations.

Implementation

As background, the system is implemented with an offline, asynchronous generator that creates the base recommendations, and an online, real-time web service that provides the recommendations to the website, email, or other service. The system can be implemented in two ways: (1) the persona recommendations are included in the personal recommendations for that shopper using the offline process, and the real-time web service requests personal recommendations with a customer ID, or (2) the persona recommendations are created by the offline process, and the real-time web service converts the customer ID into the persona, and requests the persona recommendations to use for that customer ID, if additional recommendations are required. Option 1 takes more memory to store the recommendations, but is faster. It also enables business rules to be implement without affecting speed.

Target Shoppers by Persona

In this embodiment, the goal is to find shoppers likely to buy a target product, where the shoppers have minimal purchases.

In the preferred embodiment, the solution is very similar to that described above in section Genomic Personalization B on page 14. The difference is that the products are related to the percentage of purchase of the persona rather than the individual characteristics, and shoppers with matching personas are likely to buy the product.

In the alternative embodiment, the persona recommendations are created with a larger list size, where M is usually 40 to 80. For the target product, the persona recommendations are searched, when the product is found, shoppers with that persona are added to the shopper list with the likelihood included for the persona recommendation. If the shopper already exists, the likelihoods are summed. The shoppers with the largest likelihoods are most likely to buy the product.

For either embodiment, there is a hierarchy. Shoppers that have said target product recommended based upon purchase data are listed before shoppers with said target product recommended based upon viewed data, who are listed before shoppers with said target product recommended based upon persona.

8. Marketplaces for Customer Acquisitions

A novel personal 1-1 customer acquisition method is shown where customer characteristics and preferences are obtained by the customer shopping or entering information into a marketplace. Then, this information is used to target customers by a retailer and/or by a product.

Retailers sell products in a virtual, online marketplace and customer use a marketplace to shop, or suggest items or categories of items they would like to buy. When a customer provides suggestions, characteristics and/or their email address, said customer can win items. The system can also save wish lists to help friends find gifts for the customer. Other methods can be used to entice the customer to share preferences and characteristics. In addition, when they purchase this information is obtained. This information is stored on the marketplace's servers. The marketplace has product recommendations.

Using personalization algorithms from this application and the applications incorporated by reference, customers or new shoppers (a customer with no purchases) that will buy a specific product or from a retailer are found. These customers are targeted with that product, or products from that retailer. The customer can be sent an email or targeted ads on the platform when viewing with their device. The retailer pays for the 1-1 targeting. This targeting takes the customer to the retailer's website or their product in the marketplace. Furthermore, the retailer is informed to retarget this customer when they visit the website since it is know this customer is likely to buy from that retailer. As such, the retailer does not need to be a member of the marketplace.

9. Search and Recommendations

The combination of retail recommendations and online search provides data and correlation technology to improve search in two ways.

First, the data obtained about shopper's purchasing behavior from recommendations can be used to improve search. As background, the recommendation vendor is analyzing purchase and view data from retailers, unrelated to the search engine, like Microsoft Bing, Yahoo or Google. The purchasing behavior is used to change the ranking of the search result or paid advertisement. The rankings determine the order that the search results are shown. In the preferred embodiment, for a search result, the search result is ranked according to the sum of its text match, page or domain ranking and influence of external data from recommendations. For a paid ad, it's ranked according to the sum of its auction price (as a percentage of auction price for the highest bid), page or domain ranking and influence of external data from recommendations. Search results for organic and paid advertising are used interchangeably, unless they need to be discussed separately for clarification.

There are several ways in which external data from recommendations influence the ranking of the search results. The recommendation technology is tracking top selling products, top selling products in categories, and top selling product attributes. These top sellers are used to influence the rank such that if a product or attribute of a product is a top seller, its ranking is increases by 10% or ratio of sales to top seller with a maximum of 10%.

The recommendation technology can track the user from click on the search result to what they purchased. As such, the effectiveness of the ad is improved beyond the click-to-impressions ratio by calculating the click-to-purchase ratio, and using this latter ratio for ranking of the search results.

Furthermore, the user's behavior from purchasing on retail sites can be applied to search results. In this case, the same user is identified by the search engine and recommendation engine. Thus, these behaviors should not violate privacy and monitor general behavior, such as brand, price, and category preferences for purchased products. For example, if the user of the search engine is known to buy sale items or a specific brand, search results around sale items or the user's favorite brands are increased in ranking.

Additionally, the characteristics of the user, such as gender, age, zip/location, are linked to the shopping preferences for product attributes (brand, price, category, etc.) based upon the purchases on retailer site (e.g. using the recommendation engine). Then, the characteristic of a user of the search engine are identified, and used to rank the search results according to the shopping preferences for those characteristics. In this case, the user of the recommendation engine (i.e. shopper) and search engine (i.e. searcher) are not the same person, but related through characteristics. Thus, the privacy concerns are minimized. For example, if the recommendation engine determines that men in the 20 to 30 age range from zip code 97212 are likely to buy outdoor products in the $20 to $30 price range, when Bob, a 25 year old male from zip 97212, is searching, outdoor products in the $20 to $30 price range are ranked higher by 20%. The characteristics of the shopper can be further related to the purchase of specific products, such that the recommendation engine determines that the above characteristics are likely to buy an HMK Peak 2 jacket, that product will be greatly promoted in results. Using shopper preferences rather than linking products to user characteristics has the benefit that it can be applied to all products, so it's more likely to influence a search result. Tables with user characteristics linked to shopping preferences are used to create the ranking for the external recommendation data that influences the search results.

Second, the recommendation engine is used to improve search based upon using the recommendation engine to calculate correlation between results and search terms based upon clicks, or any other method to relate search results.

The recommendation engine determines that users who clicked on result A, also clicked on results B, C and D. Thus, when result A is shown, related results B, C and D are increased in ranking, preferably by the percentage of time they are also clicked on.

Additionally, the recommendation engine learns that users who searched term A, also searched terms B, C and D. The search engine show alternative searches based upon this behavior, such that if a user searches term A, the search engine suggests terms B, C and D. The terms should be groups of terms that are highly related, like jacket and jackets. The data for the recommendation engine is preferably from the same search session (typically defined as activity without a 30 minute period of inactivity). In addition, if the search term results in one or more clicks, the correlation is weighted more heavily such that terms that result in clicks are more likely to be shown. The clicks are equivalent to the number of purchases of a product to the recommendation engine, such that the if a term results in no clicks, it is ignored, and if a term results it 2 or 3 clicks it correlation is weighted by 2 or 3, respectively. After 3 or more clicks, the term is not weighted anymore.

10. Shopper Buy Index

Recommendation engines analyze the value of products that shoppers view and buy. A buy index is created based upon the value of products bought to products viewed by a shopper over a time period, preferably 3 to 6 months. The buy index determines the amount a retailer will spend on re-marketing and whether the retailer displays a discount in real-time or via re-marketing. (Re-marketing, also known as re-targeting, is defined as following the shopper with advertising and sending emails to get the customer back to your store.) The buy index preferably has a minimal threshold so that shoppers with small purchases have minimal influence. The preferred equation is:

BuyIndex=Value of products Bought/(Value of products Viewed+$30)

Buy indexes can be shared between across different retailers, preferably with the retailers opting into a co-op. When shared, the value of bought products and viewed products is calculated across all retailers in the co-op. The buy index has minimal influence on privacy when shared between retailers. In summary, the buy index is used to segment shoppers and determine whether or not to present a discount and/or re-market.

A high buy index, such as 0.2 and above, means the shopper is active. A retailer should spend a lot of money re-marketing to this shopper. The retailer does not need to show the shopper a discount while shopping (i.e. in real time) or send a discount in re-marketing.

A medium buy index, such as 0.05 to 0.2, means the shopper is active but needs prompting to purchase. Re-marketing is good and 10% discounts will help motivate purchases.

A low buy index, below 0.05, means the shopper is not active. The retailer may want to provide a 10% discount on the website, but not re-market to that shopper.

11. Dynamic Responsive and Mobile Websites

Responsive websites look good for large desktop display, medium tablet displays and small mobile phone displays. They are currently created from Cascading Style Sheets (CSS) that includes designs for two or more screen sizes. Optimally, one CSS file is used so the website is not reloaded as the window size changes. Responsive design may jump between two or more designs as you change screen size, or reduce the window size of a browser. Optimally, it smoothly reduces image size, moves images below each other and wraps text and moves or hides page elements as the screen or window size reduces. Responsive websites typically move from a horizontal design, i.e. horizontal menus and images arrange horizontally, to a vertical design, with images arrange vertically and rotating or drop-down menus.

For mobile specific website, the screen size or operating system is used to choose a mobile or desktop website design, and the CSS for that site is loaded. Again, a vertical layout is commonly used.

Both responsive and mobile websites require expensive web designers, and typically are designed from scratch.

The novel method uses JavaScript and a user dashboard to create a responsive or mobile website from an existing template. The JavaScript dynamically resizes and moves objects through the document object model (DOM). This allows the website owner to control their design and reduce costs.

For an existing website, the elements of the website, such as images, text, and carousels, are not usually well labeled. Labels, such as id's or class's, are used to dynamically change element designs with JavaScript. In CSS, id's and class's are different labels to accomplish similar tasks. They are used interchangeably in this application, labeled IDs.

This is the original website with core CSS. The following steps dynamically convert this website into a responsive website.

In the first step, an existing site is identified by the user. Specifically, the user logs into a dashboard and identifies the site. The dashboard provides a small amount of JavaScript to identify the site and load the dynamic JavaScript required to dynamically control the site layout, and the user adds this code to the header of the site. JavaScript automatically steps through the site's DOM, and creates IDs for each page element, resulting in a map of IDs and elements. The solution uses any existing IDs and features such as nesting, specific text or image names to identify elements.

For example, an ID may be below a row (tr) that contains a table that contains an element of the class RelatedItems, and also contains a row that includes a cart image. The example code below shows how ID5 is linked to the element within the nested structure described in the previous sentence. This example uses JQuery. You could also use Regex.

ID5.divSelect=$("tr:has(table.RelatedItems)").filter(":
has(tr img[src*=Cart])");
ID5.divPosition="below";

In the second step, the user utilizes the dashboard to arrange the elements for different window sizes. The user can select to hide, move, resize, add, or turn to popup for each element. The criteria is based upon windows size, browser type (IE, Firefox, Chrome, Safari, etc.), and operating system (OS). In a simple case with two window sizes and an existing desktop site, the user places each element vertically for window widths below 400 pixels. The user can also select that an image should reduce its size as the width narrows further. The dashboard is preferably graphical, and allows standard graphical design techniques. When the user selects an ID, the website element is shown or highlighted on the website, and vice-versa.

In the third step, the dashboard automatically creates hosted JavaScript and CSS elements to implement the design for the responsive site. The JavaScript and CSS are loaded via the JavaScript loader that was added to the site in step 1, and, voila, the site is responsive. Typically, the JavaScript includes a master file used for all websites, a platform file for each platform, like Wordpress, Magento, Big Commerce, or any content management system (CMS), and a website file for actions specific to that website. Typically, the CSS is website specific, too. The creation process includes creating JavaScript, re-arranging existing JavaScript, and setting JavaScript or CSS parameters.

The desired site will appear by the browser starting to display the original website based upon the core CSS. Then, the JavaScript will modify the website inside the browser to create the desired website per the design in the second step for the current criteria.

For new sites, this methodology can be used. Ideally, the first step is not necessary because the site is designed with IDs for each element.

Furthermore, this methodology could be used to allow a non-technical person, such as the site owner, to change any website. If the site is new and elements are labelled, step 1 is skipped. It does not have to be dependent upon screen size. It could just be that the site owner wants to add, move, resize or convert to popup for elements in a static site. If the site uses a CMS, the elements can be dynamically linked to the CMS database.

Additionally, if the site is an ecommerce site, the elements of the product page are typically product image, name, description, price, sales price, recommendations and ratings & reviews. The home page shows featured and/or top sellers with a video and some background about the store. The category landing page shows product images, name and price for products in that category, arranged by the user, defaulting with new product first, top sellers first, or by ratings, and recommendations for that shopper of products in that category. The cart shows the products in the cart, cross-sell recommendations, and checkout.

Standard sets of rules can be created to arrange this content using best practices. Then, once step 1 is completed, the dashboard can prompt the user to select the desired rule set and identify the required elements for that rule set. This simplifies setup because the user has fewer decisions to make and does not need to have design or layout experience.

Finally, this solution can be used to personalize the content on the website. For this case, in step 3, the criteria is based upon the website visitor's characteristics. For example, if the visitor is over 50, larger fonts are used and site scaling for responsive design happens sooner to keep larger fonts. If the visitor is male, darker colors are used and different graphics than if the visitor is female. For retail sites, this personalization is combined with product recommendations such that products that the shopper is likely to buy are shown to the shopper.

Dynamic images, as discussed in our previous applications, can be used to personalize emails. The image name includes the characteristics, or the recipients ID, which our system links to characteristics, and the image sent to the email is appropriate for the recipient's characteristics. Similar to the previous example, darker images are shown to men versus women.

CONCLUDING REMARKS

The foregoing descriptions of the preferred embodiments of the invention have been presented to teach those skilled in the art how to best utilize the invention. To provide a comprehensive disclosure without unduly lengthening the specification, the applicants incorporate by reference the patents, patent applications and other documents referenced above. Many modifications and variations are possible in light of the above teachings, including incorporated-by-reference patents, patent applications and other documents. For example, methods to determine related items can be used to determine similar items, and vice-versa.

What is claimed is:

1. A method to create personalized product recommendations in an electronic format for a specific shopper from a group of shoppers and a target product from a group of products, where each product has one or more attributes from a group of attributes, and where the method provides personalized product recommendations in which different product recommendations are provided for different shoppers for the same target product, comprising the steps of:
   a. identifying the specific shopper's preference value for an attribute, where the preference value is calculated using the specific shopper's behavior with other products with the same attribute, and calculating preference values for several other shoppers within the group of shoppers and the attributes, resulting in a different preference value for each shopper and each attribute,
   b. caching recommendation data for each shopper, the recommendation data comprising a subset of the group of attributes for each shopper, wherein the subset contains the N attributes with the largest preference values for each shopper,
   c. creating product recommendations based on correlation values between product pairs, where each correlation value represents a likelihood of purchase, and calculating the likelihood of purchase for several product pairs, wherein the product recommendations for each product are the products with the largest likelihood of purchase,
   d. personalizing the product recommendations for the target product for the specific shopper by obtaining the product recommendations for the target product, adjusting the likelihood of purchase for each product recommendation based on at least one of the attributes of the recommended product matching an attribute in the subset of the group of attributes for the specific shopper, and adjusting the likelihood of purchase based on the specific shopper's preference value for the attribute, and e. automatically displaying in real-time via a web service one or more of the personalized product recommendations in order of the adjusted likelihood of purchase, wherein steps (a) and (c) are computationally complex and performed by an offline process that transforms behavioral data to product recommendation tables, and steps (b), (d), and (e) are performed by a real-time process that uses the product recommendation tables.

2. The method of claim 1 wherein an attribute is a category and products can belong to several categories.

3. The method of claim 1 wherein personalizing comprises changing the order in which the product recommendations are shown to the specific shopper.

4. The method of claim 1 wherein the specific shopper's behavior of step (a) and correlation value in step (b) are both based on purchasing of products.

5. The method of claim 1 wherein the specific shopper also specifies their preferred attributes, and the likelihood of purchase is increased when one of the product recommendations has one or more of said preferred attributes.

6. The method of claim 1 wherein the specific shopper's behavior in step (a) is the shopper's purchasing behavior and the correlation value of step (b) is based on shopper view behavior.

7. The method of claim 1 wherein the specific shopper specifies product attributes that they dislike, and the likelihood of purchase is decreased when the recommendations have said preferred product attributes.

* * * * *